(12) United States Patent
Ishihara et al.

(10) Patent No.: US 11,908,335 B2
(45) Date of Patent: Feb. 20, 2024

(54) SYSTEM AND METHOD FOR SUGGESTING SWITCHING OPERATIONAL MODES OF A GROUND PROXIMITY WARNING SYSTEM

(71) Applicant: HONEYWELL INTERNATIONAL INC., Charlotte, NC (US)

(72) Inventors: Yasuo Ishihara, Phoenix, AZ (US); Margaret Wintermute, Redmond, WA (US); Supratik Gon, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/822,216

(22) Filed: Aug. 25, 2022

(65) Prior Publication Data
US 2024/0021094 A1 Jan. 18, 2024

(30) Foreign Application Priority Data
Jul. 13, 2022 (IN) .............................. 202211040198

(51) Int. Cl.
*G08G 5/04* (2006.01)
*B64D 45/04* (2006.01)
*B64C 27/00* (2006.01)

(52) U.S. Cl.
CPC ............... *G08G 5/04* (2013.01); *B64D 45/04* (2013.01); *B64C 27/00* (2013.01)

(58) Field of Classification Search
None
See application file for complete search history.

(56) References Cited

U.S. PATENT DOCUMENTS

| 4,987,413 A * | 1/1991 | Grove ................... G01C 5/005 340/963 |
| 6,484,072 B1 * | 11/2002 | Anderson ............ G01C 23/005 701/16 |
| 6,583,733 B2 * | 6/2003 | Ishihara ................. B64D 45/04 701/9 |
| 7,633,430 B1 * | 12/2009 | Wichgers ................. G01S 7/04 340/963 |
| 7,859,448 B1 * | 12/2010 | Woodell ............... G01S 13/935 342/26 B |
| 8,098,192 B1 * | 1/2012 | Wichgers ............. G01S 13/953 342/63 |

(Continued)

FOREIGN PATENT DOCUMENTS

EP 1285227 A2 2/2003

*Primary Examiner* — Fekadeselassie Girma
(74) *Attorney, Agent, or Firm* — Lorenz & Kopf LLP (57) ABSTRACT

An avionic system for a rotorcraft includes a data source and an enhanced ground proximity warning system. The data source has terrain data and obstacle data stored therein. The enhanced ground proximity warning system can be selectively switched, by a pilot, to operate in either a normal mode or a desensitized mode. The enhanced ground proximity warning system receives flight data, retrieves terrain data and obstacle data from the data source, evaluates the retrieved terrain data and the obstacle data to determine variations in elevations of terrain and obstacles in predetermined area that is a predetermined distance ahead of the current position and along the flight path, and based at least in part on the determined variations, selectively generate a prompt that suggests that the pilot switch the ground proximity warning system to the desensitized mode.

20 Claims, 4 Drawing Sheets

(56) References Cited

U.S. PATENT DOCUMENTS

| | | | | |
|---|---|---|---|---|
| 8,232,910 | B1* | 7/2012 | Burton | G08G 5/0021 |
| | | | | 342/26 B |
| 8,234,020 | B1* | 7/2012 | Wichgers | G08G 5/0021 |
| | | | | 701/9 |
| 8,554,264 | B1* | 10/2013 | Gibbons | H04W 52/322 |
| | | | | 455/67.11 |
| 9,633,567 | B1* | 4/2017 | Skoog | B64D 45/04 |
| 10,577,123 | B1* | 3/2020 | Kirtz | G08G 5/025 |
| 10,713,962 | B1* | 7/2020 | S | B64D 45/00 |
| 11,348,468 | B1* | 5/2022 | Smith | B64D 43/00 |
| 2002/0099478 | A1* | 7/2002 | Ishihara | G01C 5/005 |
| | | | | 340/963 |
| 2003/0093187 | A1* | 5/2003 | Walker | B64D 45/0059 |
| | | | | 701/1 |
| 2008/0059010 | A1 | 3/2008 | Conner et al. | |
| 2010/0023264 | A1* | 1/2010 | G. | G01C 23/00 |
| | | | | 701/301 |
| 2010/0286851 | A1* | 11/2010 | Ishihara | G08G 5/0021 |
| | | | | 701/9 |
| 2010/0305784 | A1* | 12/2010 | Anderson | G01C 23/005 |
| | | | | 701/9 |
| 2011/0125346 | A1* | 5/2011 | Ben-Arie | G01C 5/00 |
| | | | | 701/3 |
| 2013/0204523 | A1* | 8/2013 | He | G08G 5/0021 |
| | | | | 701/527 |
| 2016/0217697 | A1* | 7/2016 | Huber | G05D 1/0646 |
| 2019/0127082 | A1* | 5/2019 | Oltheten | B64C 27/006 |

* cited by examiner

SYSTEM AND METHOD FOR SUGGESTING SWITCHING OPERATIONAL MODES OF A GROUND PROXIMITY WARNING SYSTEM

CROSS-REFERENCE TO RELATED APPLICATION

This application claims priority to India Provisional Patent Application No. 202211040198, filed Jul. 13, 2022, the entire content of which is incorporated by reference herein.

TECHNICAL FIELD

The present invention generally relates to ground proximity warning systems, and more particularly relates to a system and method for suggesting, to a pilot, switching operational modes of a ground proximity warning system.

BACKGROUND

Many aircraft are equipped with an enhanced ground proximity warning system (EGPWS). As is generally known, the EGPWS uses various aircraft inputs and one or more data sources to predict and warn flight crews of potential conflicts with obstacles or terrain, thereby significantly reducing the risk of controlled flight into terrain. As is also generally known, an EGPWS disposed on a rotorcraft, such as a helicopter or an urban air vehicle (UAV/UAM), is configured slightly differently than an EGPWS disposed on a fixed-wing aircraft. In particular, the EGPWS in a helicopter can be operated in at least two different modes—a normal mode and a desensitized mode. In the desensitized mode, the alert thresholds are set to allow the helicopter to fly at lower altitudes and in more congested areas without triggering an alert.

The desensitized mode is manually activated by a pilot, typically by pushing a button or switch located in the cockpit. In a traditional helicopter cockpit, this switch is a physical switch, and is usually installed on the instrument panel within easy reach by pilots. More modern helicopter cockpits include multi-function displays, which have replaced many instruments and physical switches. Often in these modern cockpits, desensitized mode switch is hidden in a sub-menu page on the multi-function display.

In both the traditional and modern cockpit, pilots may not realize a need to switch to the desensitized mode until a EGPWS alert has already been triggered. Thus, pilots are already experiencing a relatively high workload flying the aircraft and also having to deal with EGPWS alert.

Hence, there is a need for a system and method of proactively prompting pilots of the possible need to switch the EGPWS to the desensitized mode to reduce the risk of nuisance alerts prior to getting into the situation. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an avionic system for a rotorcraft includes a data source and an enhanced ground proximity warning system. The data source has terrain data and obstacle data stored therein. The enhanced ground proximity warning system can be selectively switched, by a pilot, to operate in either a normal mode or a desensitized mode. The enhanced ground proximity warning system is in operable communication with the data source, and is coupled to receive flight data that is representative of at least a current position of the rotorcraft and of a flight path of the rotorcraft and is configured, upon receipt thereof, to: retrieve terrain data and obstacle data from the data source along the current flight path of the rotorcraft, evaluate the retrieved terrain data and the obstacle data to determine variations in elevations of terrain and obstacles in predetermined area that is a predetermined distance ahead of the current position and along the flight path, and based at least in part on the determined variations, selectively generate a prompt that suggests that the pilot switch the ground proximity warning system to the desensitized mode.

In another embodiment, a method for suggesting that a pilot switch operation of an enhanced ground proximity warning system installed in a rotorcraft from a normal mode to a desensitized mode includes supplying a data source that includes terrain data and obstacle data and, in the ground proximity warning system: receiving flight data that is representative of at least a current position of the rotorcraft and of a flight path of the rotorcraft, retrieving terrain data and obstacle data from the data source along the flight path of the rotorcraft, evaluating the retrieved terrain data and the retrieved obstacle data to determine variations in elevations of terrain and obstacles in a predetermined area at a predetermined area ahead of the current position and along the flight path of the rotorcraft, and based at least in part on the determined variations, selectively generating an prompt that suggests that the pilot switch the ground proximity warning system to the desensitized mode.

In yet another embodiment, a rotorcraft includes a fuselage, a data source, and an enhanced ground proximity warning system. The data source is disposed within the fuselage and has terrain data and obstacle data stored therein. The enhanced ground proximity warning system is disposed within the fuselage and can be selectively switched, by a pilot, to operate in either a normal mode or a desensitized mode. The enhanced ground proximity warning system is in operable communication with the data source, and is coupled to receive flight data that is representative of at least a current position and of a flight path of the rotorcraft and is configured, upon receipt thereof, to: retrieve terrain data and obstacle data from the data source along the current flight path of the rotorcraft, evaluate the retrieved terrain data and the obstacle data to determine variations in elevations of terrain and obstacles in predetermined area that is a predetermined distance ahead of the current position and along the flight path, and based at least in part on the determined variations, selectively generate a prompt that suggests that the pilot switch the ground proximity warning system to the desensitized mode.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
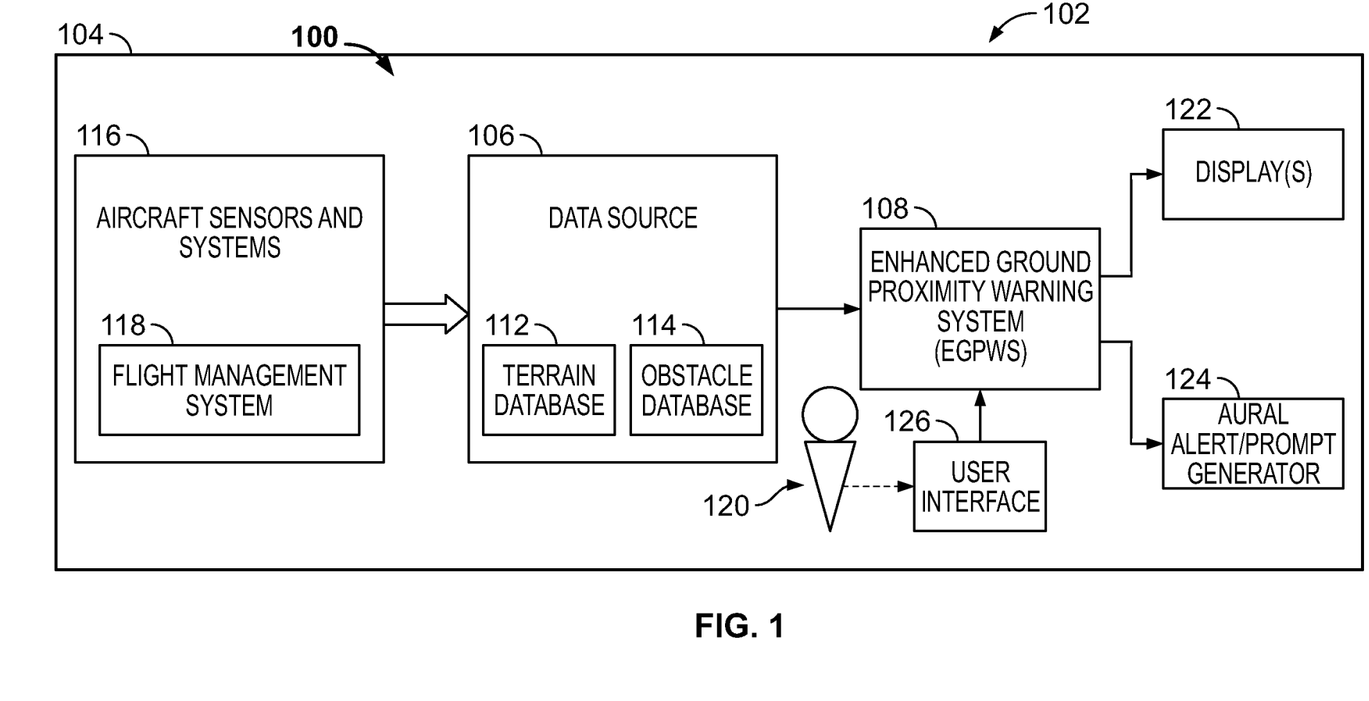
FIG. 1; depicts a functional block diagram of one embodiment of an avionic system.

Referring to FIG. 1, a functional block diagram of one embodiment of an avionic system 100 is depicted. The system 100 is disposed on or within a rotorcraft 102, and more specifically on or within the rotorcraft fuselage 104, and includes at least a data source 106 and an enhanced ground proximity warning system 108. It should be noted that the term rotorcraft, as used herein, encompasses various types of rotary aircraft including various types of helicopters and various types of urban air mobility (UAM) aircraft.

The data source 106 is disposed within the fuselage 104 and has terrain data and obstacle data stored therein. In the depicted embodiment, the data source separately comprises both a terrain database 112 having the terrain data stored therein, and an obstacle database 114 having the obstacle data stored therein. It will be appreciated, however, that in other embodiments, the data source could be implemented using a single database that has both terrain and obstacle data stored therein.

Figure 2:
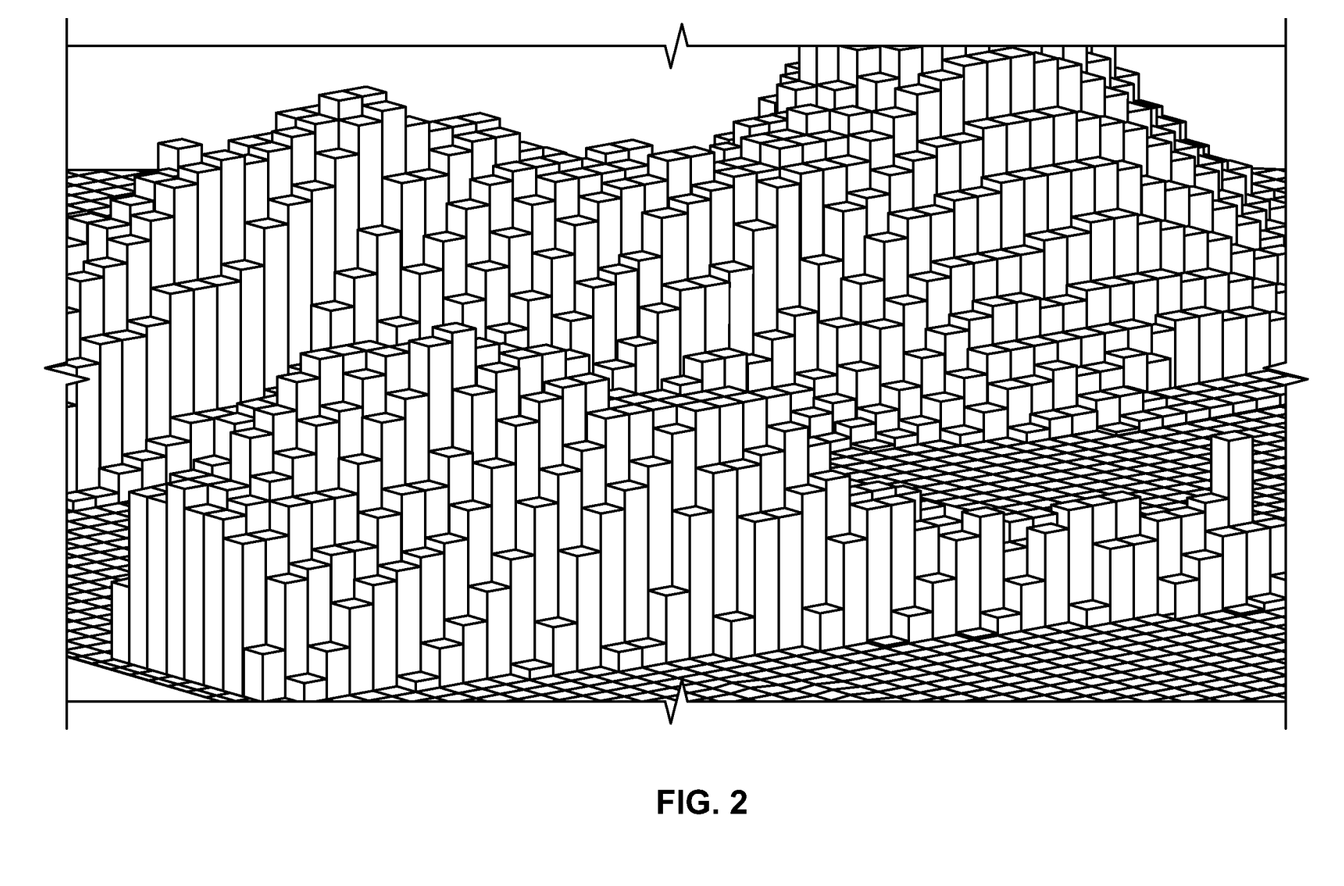
FIG. 2 depicts an example embodiment of digital representations of a section of terrain.

Regardless of how the data source 106 is specifically implemented, and as is generally known, the terrain data and the obstacle data are digital representations of the elevation of terrain and obstacles, respectively, at a number of discrete points. Some features of the terrain data include, for example, geometric distribution/position of discrete points, horizontal/vertical datum and specific units of measurement associated with terrain (e.g., naturally occurring features such as mountains, hills, ridges, valleys, bodies of water, permanent ice and snow, etc.), Some features of the obstacle data include the horizontal and—vertical extent of man-made features. For completeness, an example embodiment of digital representations of a section of terrain are depicted in FIG. 2.

Returning to FIG. 1, the enhanced ground proximity warning system 108 is disposed within the fuselage 104 and is in operable communication with the data source 106. As FIG. 1 also depicts, the enhanced ground proximity warning system 108 is additionally in operable communication with various aircraft sensors and systems 116 within the rotorcraft 102. These sensors and systems 116 supply various flight data to the ground proximity warning system 108. Some non-limiting examples of these flight data include current position, altitude, attitude, airspeed, ground speed, heading, current flight path, and/or intended flight path, just to name a few. To this end, and as FIG. 1 also depicts, the various systems 116 may, at least in some embodiments, include a flight management system 118. The flight management system 118 is configured to generate and supply the intended flight path based on the flight plan.

As is generally known, the enhanced ground proximity warning system 108 uses the inputs supplied from the various systems 112, together with the terrain data and the obstacle data, to determine if the rotorcraft 102 is within a predetermined threshold distance of terrain or an obstacle. If so, then a suitable alert is generated. The generated alert may be an aural alert, a visual alert, or a combination thereof. As such, and as FIG. 1 further depicts, the system 100 may additionally include one or more displays 122 and/or one or more aural alert generators 124.

As is also generally known, the enhanced ground proximity warning system 108 can be selectively switched, by a pilot 120, to operate in either a normal mode or a desensitized mode. When the enhanced ground proximity warning system 108 is switched to the desensitized mode, the alert thresholds are set to allow the rotorcraft 102 to fly at lower altitudes and in more congested areas without generating an alert. To switch the enhanced ground proximity warning system 108 to the desensitized mode, the pilot 120 interacts with a user interface device 126. The user interface device 126 may be implemented as a dedicated, cockpit mounted switch that is in operable communication with the ground proximity warning system 108, or a switch on a multi-function display that is associated with a selected menu page.

In addition to the generally known functions, the depicted enhanced ground proximity warning system 108 is configured to implement additional functionality. Specifically, it is configured, upon receipt of at least the flight data, to retrieve terrain data and obstacle data from the data source 106, not just at its current position, but along the flight path of the rotorcraft 102. The enhanced ground proximity warning system 108 then evaluates the retrieved terrain data and the retrieved obstacle data to determine variations in elevations of terrain and obstacles in a predetermined area that is a predetermined distance ahead of the current position and along the flight path. Then, based at least in part on the determined variations, the enhanced ground proximity warning system 108 selectively generates a prompt, either visual, or textual, or both, that suggests that the pilot 120 switch the enhanced ground proximity warning system 108 to the desensitized mode. It will be appreciated that the predetermined area and the predetermined distance may vary, but one example of a suitable distance and area is a distance that corresponds to 120 seconds ahead of the current position and an area at that distance that extends 1 NM left and 1 NM right. It will additionally be appreciated that the term "flight path" as used herein may, in some embodiments, refer to the current flight path of the rotorcraft, and in other embodiments may refer to the intended flight path, which is based on the flight plan data in the flight management system.

The manner in which the enhanced ground proximity warning system 108 evaluates the retrieved the terrain data and obstacle data to determine variations in elevations of terrain and obstacles may vary. As noted above, the terrain data and the obstacle data are digital representations of the elevation of terrain and obstacles at a number of discrete points. Thus, in one embodiment, the enhanced ground proximity warning system 108 is configured to count, at the predetermined distance ahead of the current position and along the flight path, the number of discrete data points that indicate an elevation above the aircraft altitude in the predetermined area along the flight path. If the number of discrete data points exceeds a predetermined number, the enhanced ground proximity warning system 108 generates the prompt that suggests that the pilot 120 switch the enhanced ground proximity warning system 108 to the desensitized mode.

In another embodiment, the enhanced ground proximity warning system 108 is configured to determine, in the predetermined area and at the predetermined distance ahead of the current position and along the flight path, the statistical distribution of the elevations of the terrain and obstacles, and to calculate a standard deviation of the statistical distribution. In this embodiment, if the standard deviation exceeds a predetermined magnitude, the enhanced ground proximity warning system 108 generates the prompt that suggests that the pilot 120 switch the enhanced ground proximity warning system 108 to the desensitized mode.

Figure 3:
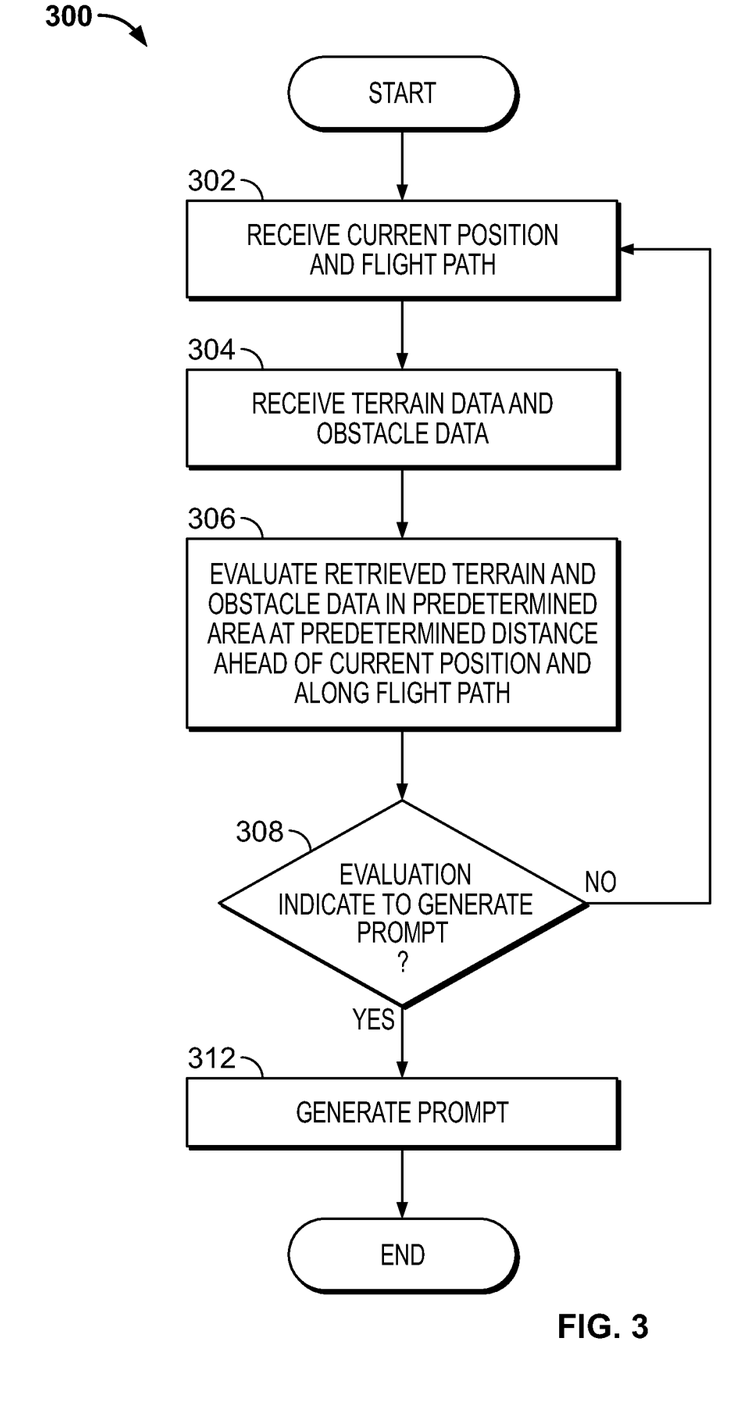
FIG. 3 depicts a method, in flowchart form, that may be implemented in the system of FIG. 1.

Having described the overall functionality of the system 100, a description of a method for suggesting that a pilot switch operation of an enhanced ground proximity warning system installed in a rotorcraft from a normal mode to a desensitized mode that is implemented in the system 100 will be described. The method 300, which is depicted in flowchart form in FIG. 3, represents various embodiments of a method for suggesting that a pilot switch operation of an enhanced ground proximity warning system installed in a rotorcraft from a normal mode to a desensitized mode. For illustrative purposes, the following description of method 300 may refer to elements mentioned above in connection with FIG. 1. In practice, portions of method 300 may be performed by different components of the described system 100. It should be appreciated that method 300 may include any number of additional or alternative tasks, the tasks shown in FIG. 3 need not be performed in the illustrated order, and method 300 may be incorporated into a more comprehensive procedure or method having additional functionality not described in detail herein. Moreover, one or more of the tasks shown in FIG. 3 could be omitted from an embodiment of the method 300 if the intended overall functionality remains intact.

The method 300 starts and the enhanced ground proximity warning system 108 receives flight data that is representative of at least a flight path and a current position of the rotorcraft 102 (302), and retrieves, from the data source 106, terrain data and obstacle data along the flight path of the rotorcraft 102 (304). The enhanced ground proximity warning system 108 evaluates the retrieved terrain data and the retrieved obstacle data to determine variations in elevations of terrain and obstacles along the flight path in a predetermined area at a predetermined distance ahead of the current position (306). The enhanced ground proximity warning system 108, based at least in part on the determined variations, selectively generates a prompt that suggests that the pilot switch the enhanced ground proximity warning system 108 to the desensitized mode. That is, it determines whether the evaluation indicates the prompt should be generated (308). If so, prompt is generated (312). If not, the method repeats.

Figure 4:
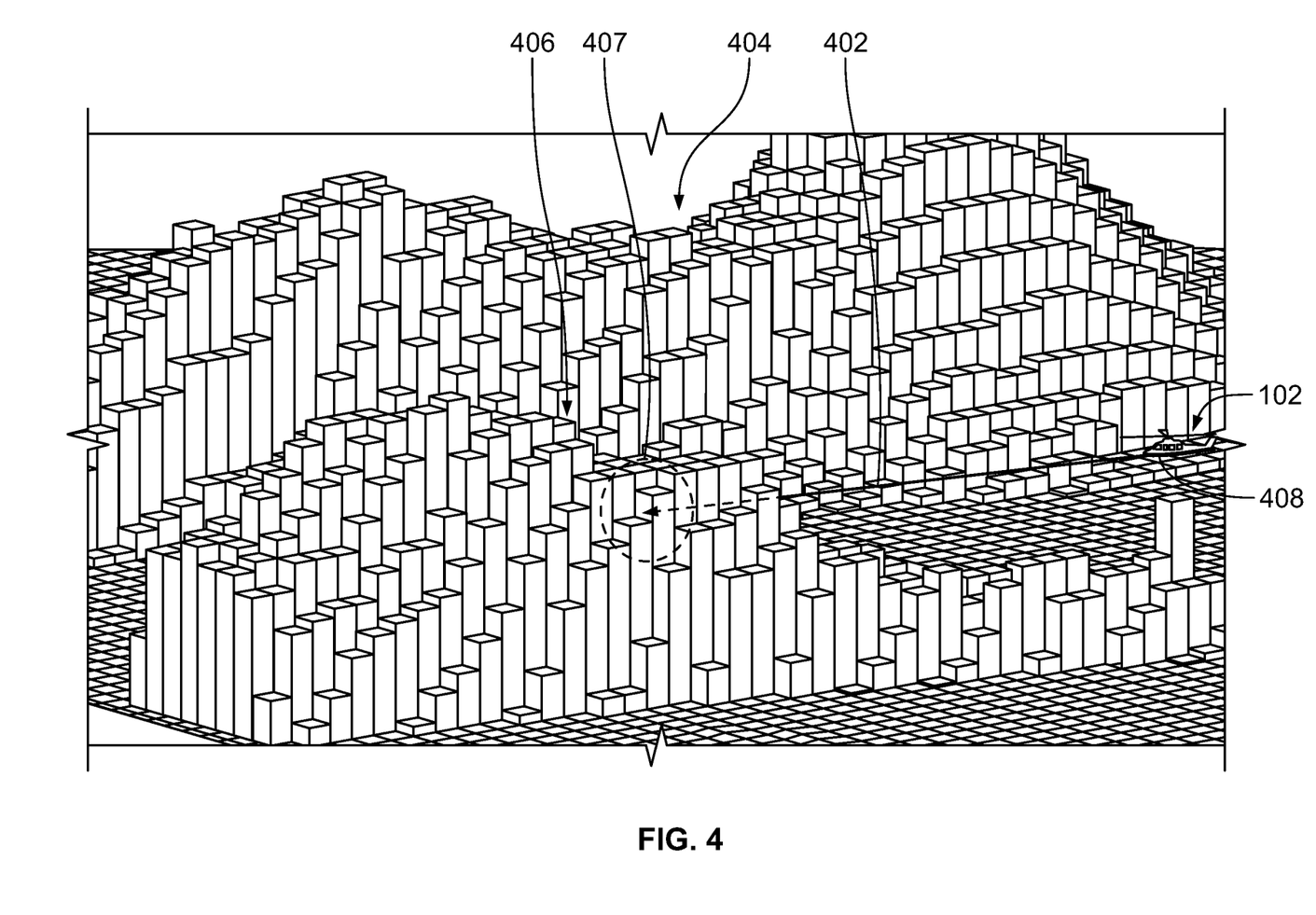
FIG. 4 provides example illustration of the method depicted in FIG. 3.

Turning now to FIG. 4, and example illustration of the above-described method 300 that is implemented in the system 100 is illustrated. As depicted therein, the terrain data along the flight path 402 of the rotorcraft 102 indicate that the rotorcraft 102 will be entering relatively narrow airspace between two mountainous regions 404, 406. The variations in elevations of the terrain in the predetermined area 407 at the predetermined distance ahead of the current position 408 and along the flight path 402 will, at least in this depicted example, result in the enhanced ground proximity warning system 108 generating the prompt that suggests that the pilot 120 switch the enhanced ground proximity warning system 108 to the desensitized mode. It will be appreciated that although the predetermined area 407 is depicted as a circular area in FIG. 4, the shape of the predetermined area is not limited to a circle.

The system and method described herein proactively prompts pilots of the possible need to switch the ground proximity warning system to the desensitized mode to reduce the risk of nuisance alerts prior to getting into a situation where the desensitized mode may be needed or desired.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An avionic system for a rotorcraft, comprising:
a data source having terrain data and obstacle data stored therein; and
an enhanced ground proximity warning system that can be selectively switched, by a pilot, to operate in either a normal mode or a desensitized mode, the enhanced ground proximity warning system in operable communication with the data source, the enhanced ground proximity warning system coupled to receive flight data that is representative of at least a current position of the rotorcraft and of a flight path of the rotorcraft and configured, upon receipt thereof, to:
retrieve terrain data and obstacle data from the data source along the current flight path of the rotorcraft,
evaluate the retrieved terrain data and the obstacle data to determine variations in elevations of terrain and obstacles in predetermined area that is a predetermined distance ahead of the current position and along the flight path, and
based at least in part on the determined variations, selectively generate a prompt that suggests that the pilot switch the ground proximity warning system to the desensitized mode.

2. The avionic system of claim 1, wherein the flight path is one of a current flight path or an intended flight path.

3. The avionic system of claim 1, wherein:
the flight data includes an aircraft altitude;
the terrain data and obstacle data are digital representations of the elevation of terrain and obstacles at a number of discrete points; and
the enhanced ground proximity warning system evaluates the retrieved terrain data and obstacle data to determine variations in elevations of terrain and obstacles by counting, at the predetermined distance ahead of the current position and along the flight path, the number of discrete data points that indicate an altitude above the aircraft altitude in the predetermined area along the flight path.

4. The avionic system of claim 3, wherein the enhanced ground proximity warning system generates the prompt when the number of discrete data points exceeds a predetermined number.

5. The avionic system of claim 1, wherein:
the flight data includes an aircraft altitude;
the terrain data and the obstacle data are digital representations of the elevation of terrain and obstacles at a number of discrete points; and
the enhanced ground proximity warning system evaluates the retrieved terrain and obstacle data to determine variations in elevations of terrain and obstacles by determining, for the predetermined area and at the predetermined distance ahead of the flight path, (i) a statistical distribution of the elevations of the terrain and obstacles and (ii) calculating a standard deviation of the statistical distribution.

6. The avionic system of claim 5, wherein the enhanced ground proximity warning system generates the prompt when the standard deviation exceeds a predetermined magnitude.

7. The avionic system of claim 1, wherein the data source comprises:
a terrain database having the terrain data stored therein; and
an obstacle database having the obstacle data stored therein.

8. A method for suggesting that a pilot switch operation of an enhanced ground proximity warning system installed in a rotorcraft from a normal mode to a desensitized mode, the method comprising the steps of:
supplying a data source that includes terrain data and obstacle data; and
in the ground proximity warning system:
receiving flight data that is representative of at least a current position of the rotorcraft and of a flight path of the rotorcraft,
retrieving terrain data and obstacle data from the data source along the flight path of the rotorcraft,
evaluating the retrieved terrain data and the retrieved obstacle data to determine variations in elevations of terrain and obstacles in a predetermined area at a predetermined area ahead of the current position and along the flight path of the rotorcraft, and
based at least in part on the determined variations, selectively generating an prompt that suggests that the pilot switch the ground proximity warning system to the desensitized mode.

9. The method of claim 8, wherein the flight path is one of a current flight path or an intended flight path.

10. The method of claim 8, wherein:
the flight data includes an aircraft altitude;
the terrain data and the obstacle data are digital representations of the elevations of terrain and obstacles at a number of discrete points; and
the step of evaluating the retrieved terrain data and obstacle data to determine variations in elevations of terrain and obstacles is implemented by counting, at the predetermined distance ahead of the current position and along the flight path, the number of discrete data points that indicate an altitude above the aircraft altitude in the predetermined area along the flight path.

11. The method of claim 10, wherein the prompt is generated when the number of discrete data points exceeds a predetermined number.

12. The method of claim 8, wherein:
the current flight path includes an aircraft altitude;
the terrain data and the obstacle data are digital representations of the elevation of terrain and obstacles at a number of discrete points;
the step of evaluating the retrieved terrain and obstacle data to determine variations in elevations of terrain and obstacles is implemented by determining, for the predetermined area and at the predetermined distance ahead of the flight path, (i) a statistical distribution of the elevations of the terrain and obstacles and (ii) calculating a standard deviation of the statistical distribution.

13. The method of claim 12, wherein the prompt is generated when the standard deviation exceeds a predetermined magnitude.

14. The method of claim 8, wherein the data source comprises:
a terrain database having the terrain data stored therein; and
an obstacle database having the obstacle data stored therein.

15. A rotorcraft, comprising:
a fuselage;
a data source disposed within the fuselage and having terrain data and obstacle data stored therein; and
an enhanced ground proximity warning system disposed within the fuselage and that can be selectively switched, by a pilot, to operate in either a normal mode or a desensitized mode, the enhanced ground proximity warning system in operable communication with the data source, the enhanced ground proximity warning system coupled to receive flight data that is representative of at least a current position and of a flight path of the rotorcraft and configured, upon receipt thereof, to:
retrieve terrain data and obstacle data from the data source along the current flight path of the rotorcraft,
evaluate the retrieved terrain data and the obstacle data to determine variations in elevations of terrain and obstacles in predetermined area that is a predetermined distance ahead of the current position and along the flight path, and
based at least in part on the determined variations, selectively generate a prompt that suggests that the pilot switch the ground proximity warning system to the desensitized mode.

16. The rotorcraft of claim 15, wherein:
the flight data includes an aircraft altitude;
the terrain data and obstacle data are digital representations of the elevation of terrain and obstacles at a number of discrete points; and the enhanced ground proximity warning system evaluates the retrieved terrain data and obstacle data to determine variations in elevations of terrain and obstacles by counting, at the predetermined distance ahead of the current position and along the flight path, the number of discrete data points that indicate an altitude above the aircraft altitude in the predetermined area along the flight path.

17. The rotorcraft of claim 16, wherein the enhanced ground proximity warning system generates the prompt when the number of discrete data points exceeds a predetermined number.

18. The rotorcraft of claim 15, wherein:
the flight data includes an aircraft altitude;
the terrain data and the obstacle data are digital representations of the elevation of terrain and obstacles at a number of discrete points;
the enhanced ground proximity warning system evaluates the retrieved terrain and obstacle data to determine variations in elevations of terrain and obstacles by determining, for the predetermined area and at the predetermined distance ahead of the flight path, (i) a statistical distribution of the elevations of the terrain and obstacles and (ii) calculating a standard deviation of the statistical distribution.

19. The rotorcraft of claim 18, wherein the enhanced ground proximity warning system generates the prompt when the standard deviation exceeds a predetermined magnitude.

20. The rotorcraft of claim 15, wherein the data source comprises:
a terrain database having the terrain data stored therein; and
an obstacle database having the obstacle data stored therein.

* * * * *